United States Patent [19]
Pohl

[11] 3,984,014
[45] Oct. 5, 1976

[54] LIFT ASSEMBLY FOR A VAN OR THE LIKE

[76] Inventor: Leo Pohl, 4808 - 11th St. N.E., Calgary, Alberta, Canada

[22] Filed: June 24, 1974

[21] Appl. No.: 482,550

[52] U.S. Cl. ............................ 214/75 R; 187/9 R; 214/75 T
[51] Int. Cl.² .......................................... B60P 1/44
[58] Field of Search ............ 187/1, 9, 17; 214/75 R, 214/75 T, 85; 14/71 M, 71 R, 71 A

[56] References Cited
UNITED STATES PATENTS

| | | | |
|---|---|---|---|
| 2,581,333 | 1/1952 | Vawter | 214/75 T |
| 2,640,612 | 6/1953 | Barry | 214/75 T |
| 3,416,677 | 12/1968 | Abfalter | 214/75 T |
| 3,516,559 | 6/1970 | Walter | 214/75 R |
| 3,651,965 | 3/1972 | Simonelli | 214/75 R |
| 3,710,962 | 1/1973 | Fowler | 214/75 R |

FOREIGN PATENTS OR APPLICATIONS

| | | | |
|---|---|---|---|
| 411,542 | 6/1934 | United Kingdom | 214/75 T |

Primary Examiner—Evon C. Blunk
Assistant Examiner—James L. Rowland
Attorney, Agent, or Firm—Millen, Raptes & White

[57] ABSTRACT

A platform is mounted in the doorway of a van so that it can be rotated from an upstanding stored position to a horizontal loading position level with the vehicle floor. From this point, it can be lowered to the ground. A particular linkage and cable-and-drum combination is disclosed which is very compact in the stored position. The unit is fully automated in that: (1) a switch, internal of the vehicle, can be actuated to mechanically open the vehicle doors and rotate the platform from the storage to the loading position or vice-versa; (2) a switch, accessible from the platform, can be actuated to lower or raise the platform between the loading and ground positions; and (3) a switch, external of the vehicle, can be actuated to open the doors and move the platform from the stored to the ground positions or vice-versa.

6 Claims, 13 Drawing Figures

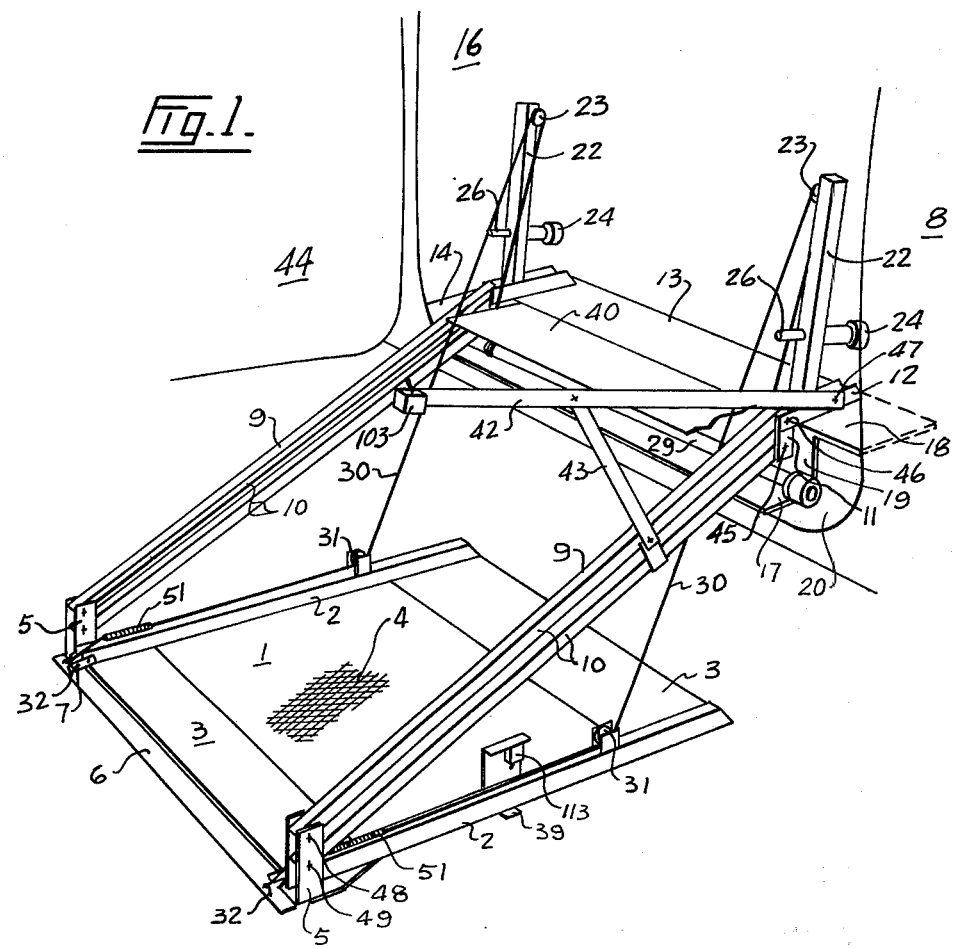
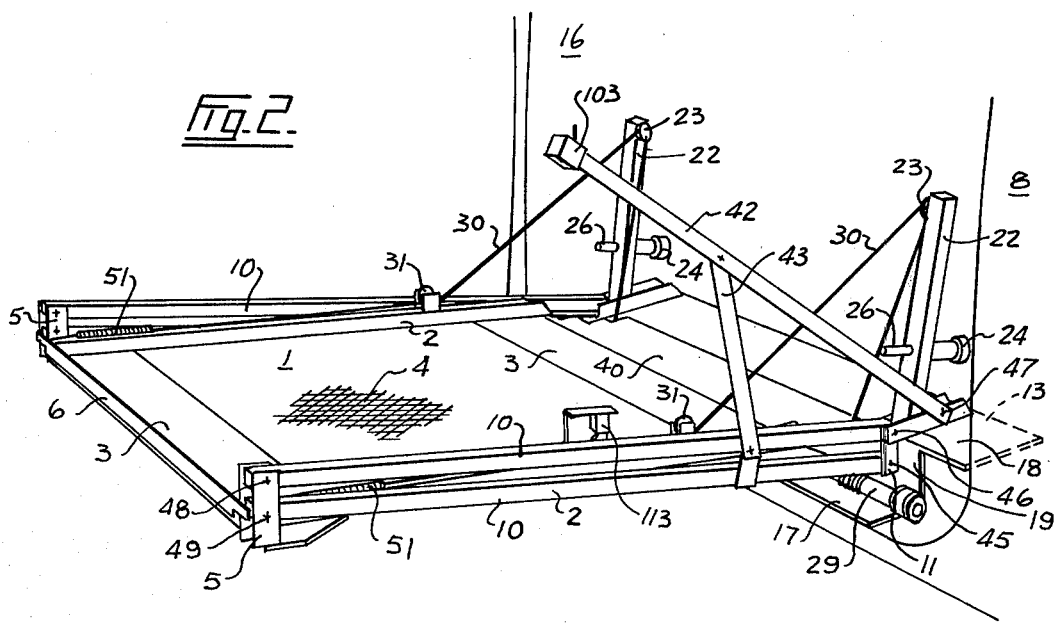

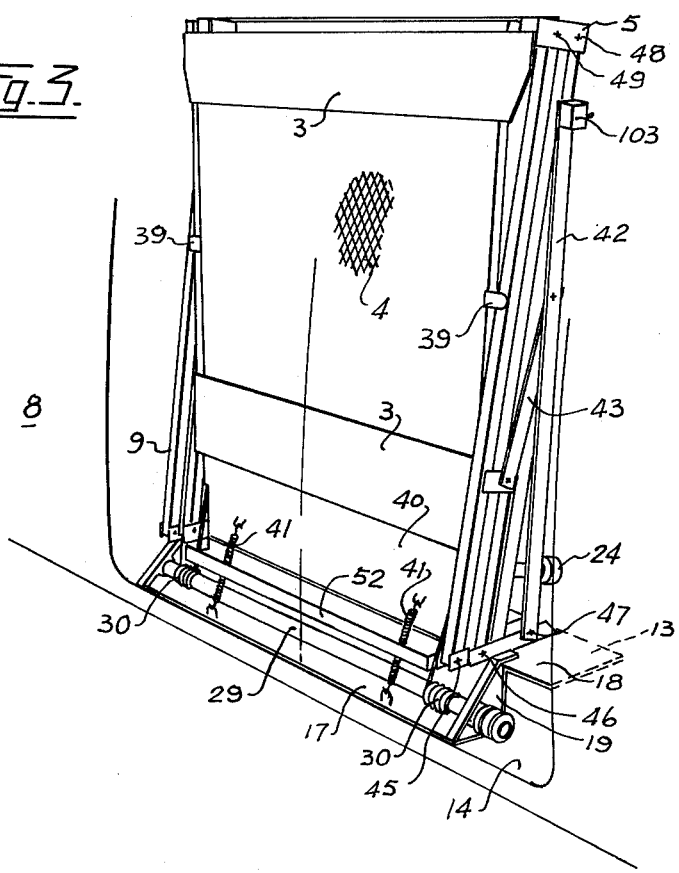
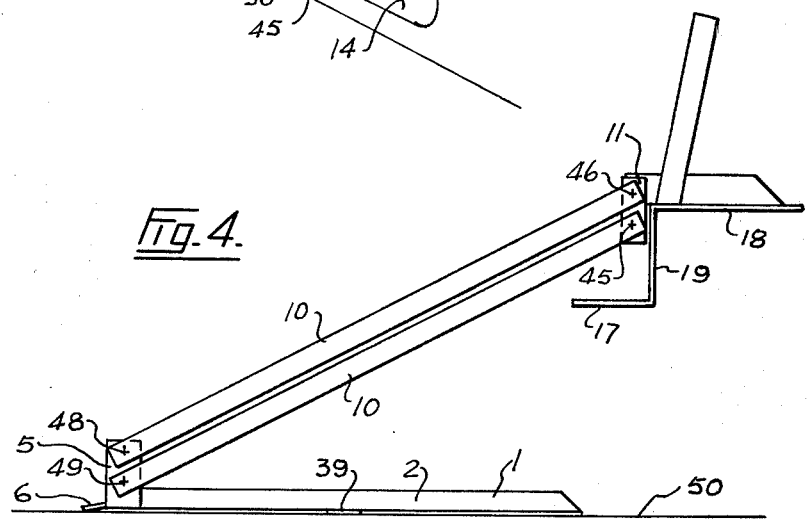
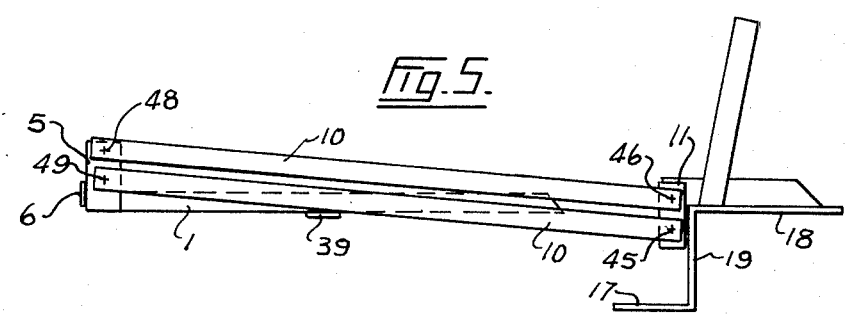

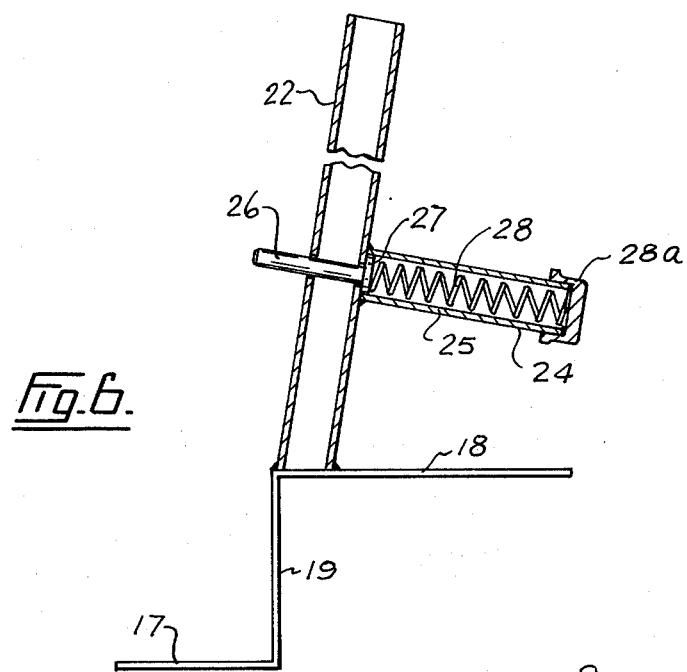
Fig. 6.
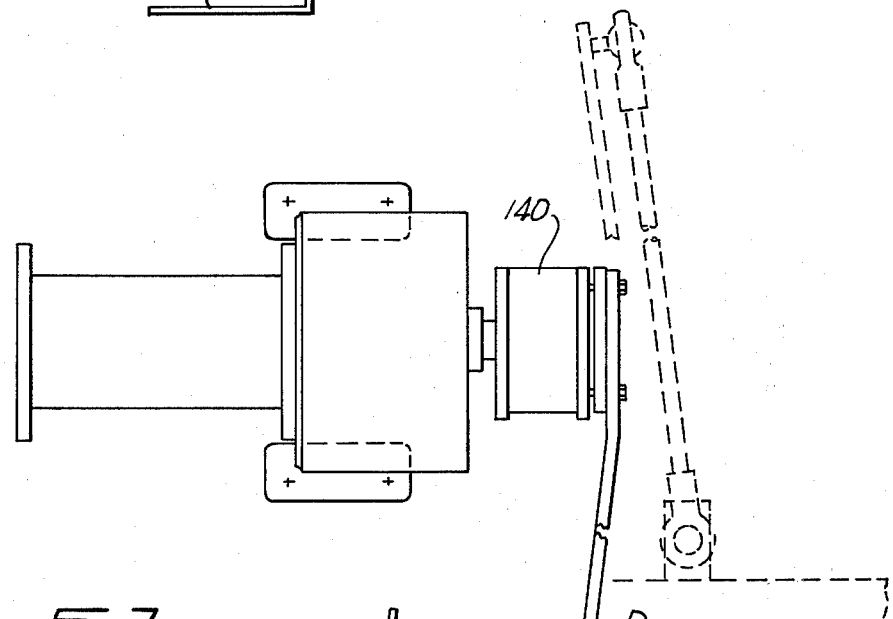
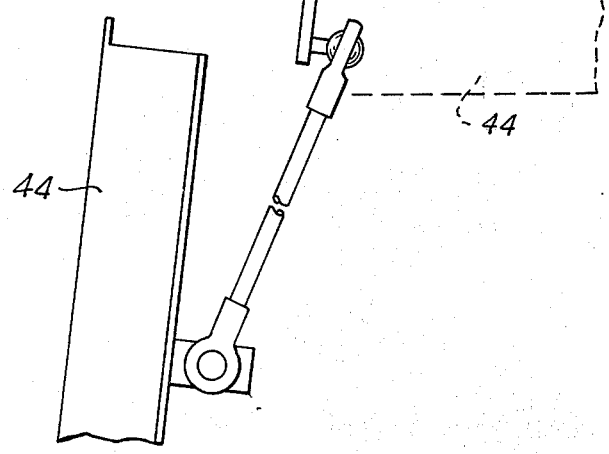
Fig. 7.

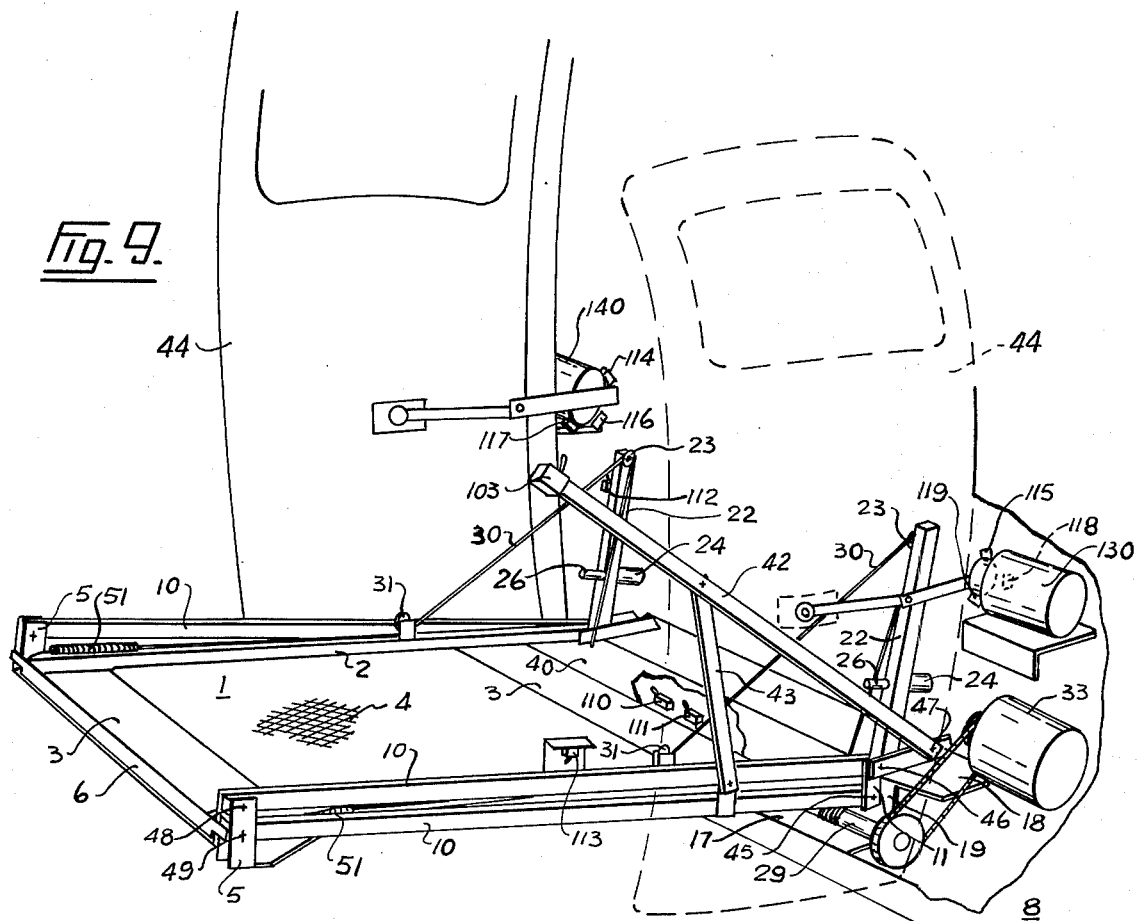
_Fig. 9._
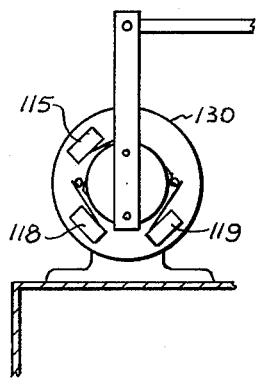
_Fig.10._
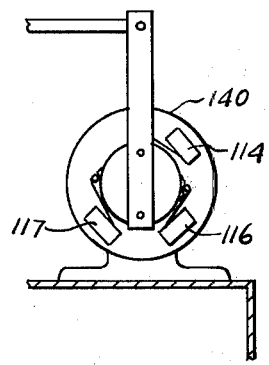
_Fig.11._

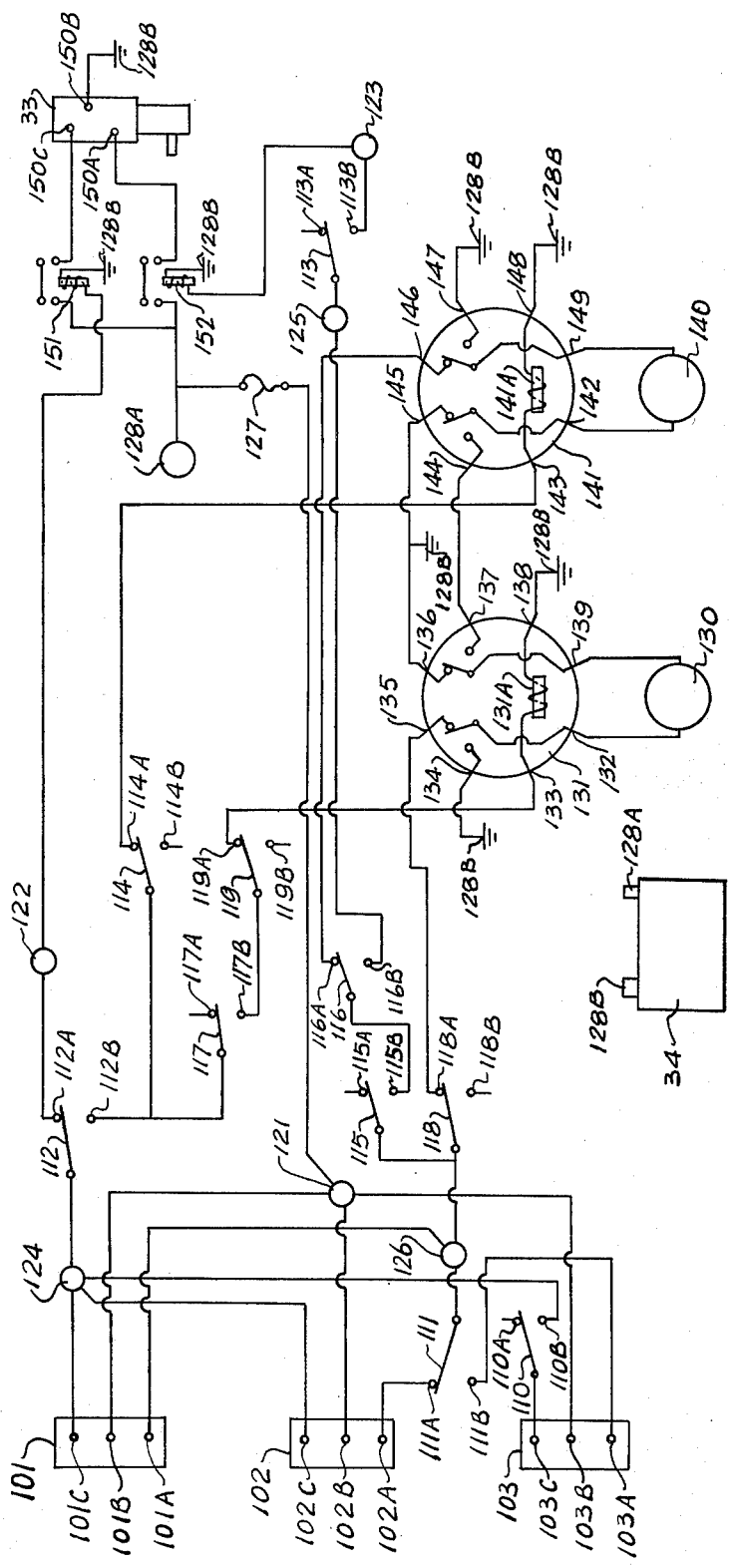

LIFT ASSEMBLY FOR A VAN OR THE LIKE

BACKGROUND OF THE INVENTION

This invention relates to a lift assembly for use in conjunction with a vehicle. More particularly, the lift assembly is adapted to be used by a person confined to a wheel chair, whereby he may lower or raise himself between the ground and the doorway of the vehicle.

A lift assembly of this type is usually mounted in a rear or side doorway of a vehicle, such as a bus or a van. It commonly comprises a platform which can be positioned exteriorially of the vehicle and level with the vehicle floor. The user wheels himself from the interior of the vehicle out onto the platform and then actuates means which lower the platform to the ground. The reverse sequence is followed to enable the user to reenter the vehicle.

In the design of these systems, a number of characteristics are sought to be attained. For example, it is desirable to have as compact an assembly as possible. This permits the maximum number of passengers to be carried in the vehicle — an important feature, as many of these assemblies are used with institutional vehicles or buses. The prior art assemblies are bulky, as they use hydraulic cylinders to raise and lower the platform. The hydraulic cylinders require the provision of an anchoring super structure within the vehicle, and hydraulic reservoirs, pumps and the like.

It is therefore one object of this invention to provide a lift assembly which is compact when stored and which uses up relatively little of the interior space of the vehicle.

Another desirable objective for a system of this type is to automate it to a point where it can be used by the handicapped person without assistance from others. The commercially available assemblies of which I am aware all require the assistance of a non-handicapped person to perform one or more functions, such as opening the doors, folding away components, or the like.

It is therefore another object of the invention to provide a lift assembly which is completely mechanized and electrically sequenced so that all the movements of the doors and platform are carried out mechanically under the control of the handicapped person.

Another desirable characteristic of a system of this type is that it be constructed of components which are simple to repair and are off-the-shelf items, commonly available even in small towns. This quality is lacking to some extent in the prior art devices. It is therefore another object of the invention to provide an assembly constructed with this desirable quality in mind.

The prior art assemblies are relatively difficult to install and involve making a substantial number of bolt holes in the vehicle. Since these holes are undesirable when the owner goes to sell or trade in the vehicle, it is therefore another object of the invention to provide an assembly which can easily be installed with relatively few bolts.

Finally, it is self-evident that the assembly should operate in as safe a manner as possible. It is therefore another object to provide an assembly designed with the safety of the user in mind.

SUMMARY OF THE INVENTION

In accordance with the invention, the platform is rotatable about a pivot connection from an upstanding stored position in the vehicle doorway to an intermediate position level with the floor. It may then be lowered or raised between the intermediate position and ground. These operations are accomplished using a novel combination of linkage means and a cable and drum system. When in the stored position, the platform and linkages come together into a compact form; the drum may be conveniently and unobtrusively located in the stairwell of the doorway.

In a preferred feature of the invention, the lift assembly is automated, thereby enabling the user to operate it alone. More particularly, the platform can be moved to various positions by mechanical means controlled by a system of electrical circuits and switches. The user, by actuating a switch, interior of the vehicle, can sequentially cause the vehicle doors to be opened and the platform to be rotated from an upright stored position to a substantially horizontal intermediate position level with the floor of the vehicle. Alternatively, he can actuate a switch, interior of the vehicle, to sequentially rotate the platform from the intermediate position to the stored position and close the doors. By actuating a switch, exterior of the vehicle, the user can sequentially cause the vehicle doors to be opened and the platform to be rotated from the stored to the intermediate positions and lowered in a horizontal condition to the ground. Alternatively, an external switch may be actuated to raise the platform from the ground to the intermediate position, rotate it to the stored position, and close the doors. In the last described sequence of operation, the user may actuate a switch, accessible to him from the platform, to lower or raise the platform between the intermediate and ground positions. As the various mechanical components of the assembly move through these motions, switches are actuated by the components themselves to stop further movement or to sequentially initiate the next required movement. Thus the user need only operate interior, exterior and platform-located switches to control all the movements of the unit.

It will be seen, therefore, that the user can cause the vehicle doors to open mechanically, and the platform to be rotated from the storage position to the intermediate position. Once loaded on the platform, he can cause the platform to be lowered to the ground. Upon leaving the platform, he can cause the platform to return to the stored position and the doors to close. If the user is outside the vehicle and wants to enter it, he can cause the doors to open and the platform to move to the ground position. Once on the platform, he actuates a switch to raise the platform to the vehicle floor. After moving inside, he can cause the platform to rotate to the stored position and the doors to close.

DESCRIPTION OF THE DRAWING

In the drawing:

FIG. 1 is a perspective view showing the platform, linkage and cable and drum components of the assembly, with the platform in the ground position;

FIG. 2 is a perspective view of the assembly of FIG. 1 in the intermediate, vehicle floor level position;

FIG. 3 is a perspective view of the assembly of FIG. 1 in the stored position, illustrating its compactness;

FIG. 4 is a simplified side view showing the relationship of the linkage, platform and standards in the ground position;

FIG. 5 is a view similar to FIG. 4, showing the components in the intermediate position, with the platform and linkage now associated together by connecting tabs carried by the platform, so that they will pivot together;

FIG. 6 is a partly broken away side view of a kick-out member, carried by each of the standards, which functions to push outwardly the inwardly-inclined, stored platform so as to cause it to begin pivoting or rotating by gravity to the intermediate position;

FIG. 7 is a top plan view of the door opening device, showing it in the closed position in shadow lines and in the open position in solid lines;

FIG. 9 is a perspective view, similar to FIG. 2, showing the notors and some of the switches;

FIG. 10 is a front view of the right hand door-opening mechanism shown in FIG. 9;

FIG. 11 is a front view of the left hand door-opening mechanism shown in FIG. 9; and FIG. 12 is a circuit diagram of the switch and motor arrangement.

DESCRIPTION OF THE PREFERRED EMBODIMENT

Figure 8:
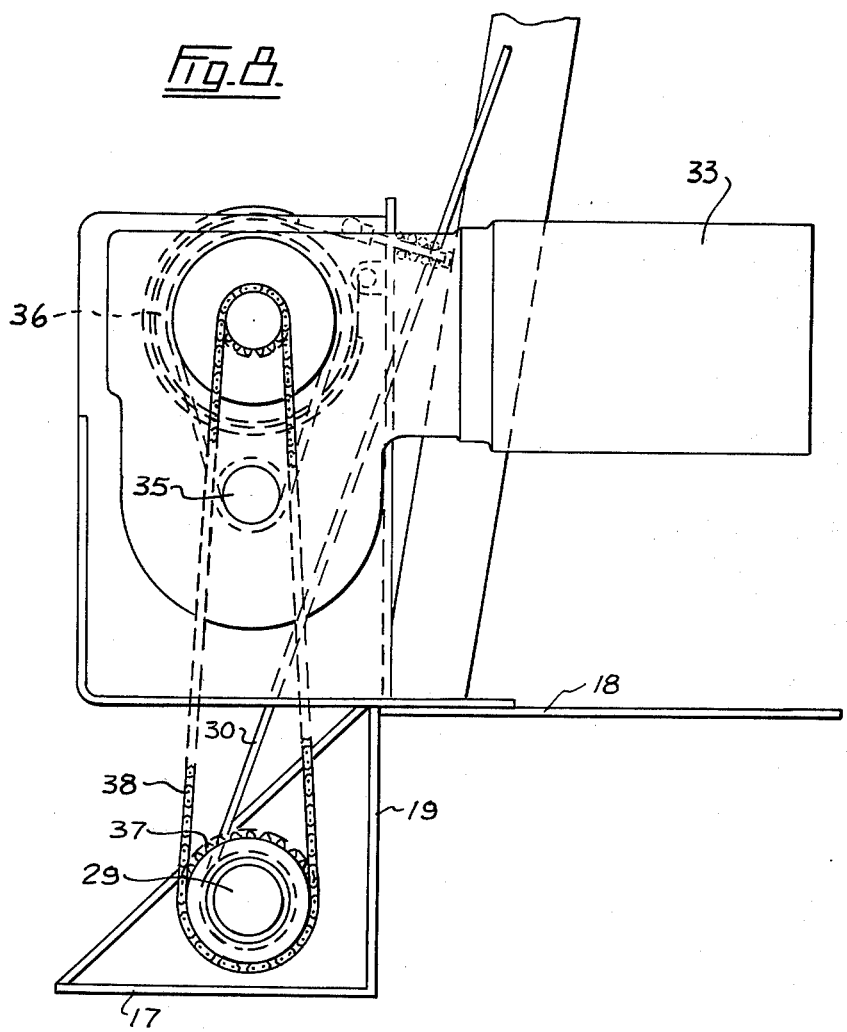
FIG. 8 is a side view illustrating the lift motor, drum and cable.
Figure 8A:
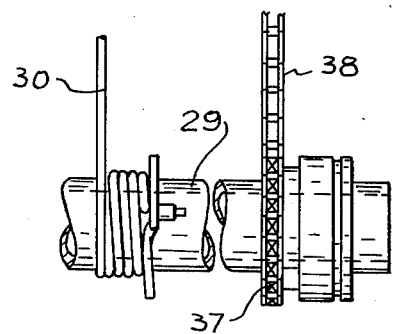
FIG. 8A is a partly broken away front view of the drum, cable, and drive chain of the left motor.

With reference now to the drawings, the lift assembly comprises a flat, rigid platform 1 made up of a pair of parallel side elements 2, transverse end plates 3, rigid mesh 4 extending between the end plates, and a pair of spaced vertical pivot plates 5 extending up from the front or outer end of each side element. The platform must support the weight of the user, so it is usually of steel construction. A locking plate 6 extends along the front edge of the front end plate 3 and is pivotally attached to side elements 2 by pivot members 7. This locking plate 6 can be rotated upwardly to an upstanding position, as shown in FIG. 2, to prevent the user's wheel chair from rolling off the platform 1.

The platform 1 is pivotally connected to the vehicle 8 by a pair of spaced, parallelogrammatic-like linkages 9. Each linkage 9 comprises a pair of vertically spaced, outwardly extending, parallel arms 10. At their front ends, the arms 10 are pivotally attached to the pivot plates 5; at their rear ends, they are pivotally attached to a link 11, which, in turn, is pivotally attached at its upper end to a member 12 forming part of the mounting frame 13. It will thus be noted that the corners of each linkage are pivotally connected, the front link 5 of each linkage 9 is rigidly fixed to the platform 1, and the rear link 11 is pivotable relative to the vehicle 8. All of these pivot connections are about axes which are substantially parallel to the vehicle floor 14.

A mounting frame 13 is attached to the vehicle 8 in its doorway 16. The frame 13 comprises forwardly and rearwardly extending horizontal plates 17, 18 connected by a vertical plate 19. The step-like frame 13 is adapted to fit into the step well 20 of the vehicle 8 and to be affixed thereto by bolts 21.

A pair of spaced, upstanding standards 22 extend upwardly from the two edge portions of the mounting frame 13. Each standard 22 carries a pulley 23 at its upper end and a kick-out member 24 intermediate its ends.

With reference to FIG. 6, each kick-out member comprises a housing 25 having a piston 26. The piston 26 extends through the standard 22 into the housing 25. A washer 27 is fixed to its inner end and a spring 28 is disposed within the housing and acts to urge the piston outwardly. A cap 28a retains the spring 28 within the housing 25.

A cable drum 29 is mounted on frame plate 13. Cables 30 extend from the drum 29, up over the standard pulleys 23, and then down for securance to the side portions of the rear end of the platform 1. More particularly, each cable 30 extends under a pulley 31, rotatably mounted on the rear end portion of the platform side element 2, and along the side element to an eye element 32 attached to the locking plate 6, to which it is fastened.

The cable drum 29 is driven in either direction by an electric motor 33 powered by the vehicle battery 34. More particularly, the output shaft 35 of the motor 33 drives a sprocket 36 which drives the cable drum sprocket 37 through chain 38. The cable drum 29 can be thereby rotated to payout or reel in the cables 30.

The platform side elements 2 are located between the linkages 9, so that the platform 1 can pass between the latter. Extending outwardly from each side element 2 are tabs 39 which function to associate the platform 1 and linkages 9 together in a manner to be described.

A hinge plate 40 is pivotally attached to the frame plate 18 so that it may rotate about its inner edge. It will be noted from FIG. 2 that the platform's inner end plate 3 is spaced from the pivot connection with the vehicle 8. This spacing permits the platform 1 to clear the step well 12 when it is being lowered or raised. The hinge plate 40 functions to bridge the gap between the edge of the vehicle floor 14 and the platform 1 to permit the user to wheel himself on or off. A pair of springs 41 connect the hinge plate 40 and the mounting plate 17 and function to cause the hinge plate to follow the platform 1.

A follower arm 42 is pivotally connected to one of the linkages 9, by the arm 43, and to the mounting frame 13. This follower arm 42 carries a control switch 103, so that it is within reach of the user during raising and lowering operations.

In operation, the platform 1 is movable between three positions: an upstanding stored position illustrated in FIG. 3; an intermediate position shown in FIG. 2, wherein its upper surface is generally substantially level with the floor of the vehicle 8; and a third position shown in FIG. 1, wherein the platform 1 rests on the ground.

In the stored position, the linkages 9 and platform 1 are connected for conjoint movement by the tabs 39. The follower arm 42 is folded alongside one linkage 9. The link 11 is disposed in a plane parallel to the floor 14 of the vehicle 8. The linkages 9, platform 1 and follower arm 42 are slightly inwardly slanted, to accomodate the curved form of the doors of the vehicle, and rest against the pistons 26 of the kick-out members 24. The pistons 26 are displaced inwardly and compress the springs 28. Although not shown, the platform pulleys 31 are located just beneath and near to the standard pulleys 23; the cables 30 are tight and press the platform 1 and linkages 9 against the kick-out members 24.

When the doors 44 of the vehicle 8 are open and the cables 30 are payed out, in a manner to be described below, the kick-out springs 28 force the platform 1, linkages 9 and follower arm 42 to rotate together outwardly about the pivots 45, 46, 47 until they are overbalanced and are capable of rotating by gravity. As the cables 30 continue to unwind, the links 11 rotate about the pivot 46 and move from the horizontal position shown in FIG. 3 to the vertical position shown in FIG. 2. The linkages 9 and platform 1, which are connected to the links 11, also rotate conjointly to assume the position shown in FIG. 2, i.e. level with the vehicle floor 14. The follower arm 42, which is also connected to the link 11, follows the linkages 9 and platform 1. The drive motor 33 is stopped, in a manner to be described, when the platform 1 is level with the vehicle floor 14. The user then wheels himself on to the platform 1. The locking plate 6, in the upstanding position, limits the outward movement of the wheel chair.

The user actuates the control switch 103 to re-activate the drive motor 33 and commence paying out more cable 30. Because the vertically positioned links 11 are blocked from further rotation about the pivot 46, the platform 1 begins to rotate about its front pivot connections 48, 49 with the front of the linkage 9.

When the platform 1 contacts the ground surface 50, the tension in the cables 30 is relieved due to the weight of the platform and occupant being carried by the ground surface rather than the cables. The springs 51 which were previously stretched, pull the cables 30 through the pulleys 23, 31 and thus allow the locking plate 6 to rotate to the ground. This locking plate 6 is attached to the now loose end of the cables 30 with the cable tension being supplied by the springs 51. As the cables 30 move due to contraction of the springs 51, a point is reached where a means is activated to stop the paying out of cable from the drum 29.

When the unit is to be operated in the reverse manner, that is to go from the ground position (deployed position) to the intermediate position, the user activates the control switch 103 which activates the drive system to commence retrieval of the cables 30. As the cables 30 are retrieved, the springs 51 are extended until the cables rotate the locking plate 6 into its upward position. The cables 30 then, being relatively inextensible, prevent further extension of the springs 51 and, through interaction with the pulleys 23, 31 begin to lift the platform 1 from the ground surface. Because the vertically positioned links 11 are maintained in a vertical position by the stop of the vehicle frame 13, the platform 1 is maintained in a substantially horizontal position while it is lifted by the cables 30 from the ground position to the intermediate position substantially level with the vehicle floor 14. When the platform 1 is in the intermediate position, means are activated to stop the retrieval of cable. At this point an occupant would wheel himself into the vehicle 8.

Another control switch 102 is then activated interior of the vehicle 8 to resume retrieval of the cables 30. This results in lifting the platform 1 further until the tabs 39 on the platform 1 interconnect the platform with the linkages 9. The platform 1 and linkages 9 then move as a unit, both rotating about the pivot 46 until they nest against pistons 26 of kick-out members 24. At that point, a means is automatically activated to prevent further retrieval of the cables 30. Also, means are automatically activated to close the doors 44 of the vehicle 8.

In the preferred embodiment, the invention is fitted with three manually activated control switches 101, 102, and 103. Switch 101, which is outside the vehicle is preferably key operated and has three positions 101A, 101B and 101C. In the 101B position, which is the normal position of switch 101, the switch is off. In the 101A position, switch 101 completes a circuit which controls the opening of the vehicle doors 44 and the deployment of the platform 1 from the stored position to ground level. In the 101C position, switch 101 completes a circuit which controls the raising of the platform 1 from ground level to the stored position and the closing of the vehicle doors 44. Switch 102, which is inside the vehicle, is preferably a toggle switch with three positions: 102A, 102B, and 102C. In the 102B position which is the normal position of switch 102, the switch is off. In the 102A position, switch 102 completes a circuit which controls the opening of the vehicle doors 44 and the deployment of platform 1 from the stored position to a position substantially level with the vehicle floor. In the 102C position, switch 102 completes a circuit which controls the raising of the platform 1 from either the ground position or the position level with the vehicle floor to the stored position and the closing of the vehicle doors 44. Switch 103 is preferably a toggle switch which is mounted on the follower arm 37 and has three positions: 103A, 103B, and 103C. In the 103B position which is the normal position of switch 103, the switch is off. In the 103A position, the switch 103 completes a circuit which controls the deployment of the platform 1 from a position substantially level with the vehicle floor to the ground level. In the 103C position, switch 103 completes a circuit which controls the raising of the platform 1 from ground level to a position substantially level with the vehicle floor.

The controlling of the sequencing of deployment and raising of the platform 1 and the opening and closing of the doors 44 is preferably performed by a number of mechanically activated limit switches or microswitches. In the preferred embodiment of the invention, there are a total of 10 limit switches with each limit switch having two positions. Limit switch 110 having positions 110A and 110B and limit switch 111 having positions 111A and 111B are located on bracket 52 and are switched by the movement of hinge plate 40. Limit switch 112 having positions 112A and 112B is located on standard 22 and is switched by deployment and retraction of the platform 1. Limit switch 113 with positions 113A and 113B is located on the platform 1 and is switched by slackening or tightening of the lift cable 30. Limit switches 115 with positions 115A and 115B, 118 with positions 118A and 118B, and 119 with positions 119A and 119B are located on the front door motor 33 and are switched by rotation of cams on the motor output shaft. Limit switches 114 with positions 114A and 114B, 116 with positions 116A and 116B, and 117 with positions 117A and 117B are located on the rear motor and are switched by rotation of cams on the motor output shaft. The reversible front door motor, 130, is energized through relay 131 containing a coil 131A having contacts 132, 133, 134, 135, 136, 137, 138 and 139. The reversible rear door motor 140 is energized through relay 141 containing coil 141A and having contacts 142, 143, 144, 145, 146, 147, 148, and 149. The reversible lift motor 33 is energized in the platform deploying rotation by solenoid 151 and in the platform raising rotation by solenoid 152.

Terminal strips 121, 122, 123, 124, 125 and 126 are provided to interconnect conductors in the circuits. The vehicle battery 34 with positive terminal 128A and negative terminal 128B is connected through fuse 127 into the control circuits and door motors.

To deploy the platform from outside the vehicle, switch 101 is switched from the 101B to the 101A position which energizes terminal strip 126. Current is then directed through limit switch 108 which is in the 108A position. This energizes relay 131 at connection 135 and 136 which actuates the front door motor 130 through connections 132 and 139 of relay 131. As the motor 130 rotates and the door opens, limit switch 115 is switched from 105A to 105B position by a cam on motor 130. When limit switch 105 is switched to 105B, current passes through limit switch 116 which is in the 116A position. This energizes relay 141 at connection 146 and 145 which starts the rear motor 140 operating through connections 142 and 149. At this point in time, both doors are opening with the front door being almost open and the rear door just starting to open. When the front door is open, a cam on motor 130 switches limit switch 118 from the 118A to the 118B position which shuts off power to the front door opening motor 130 and thus holds the door in the open position. When the rear door is open, a cam on motor 140 switches limit switch 116 from the 116A to the 116B position which shuts off power to the rear door opening motor 140 thus holding the rear door in the open position. When limit switch 116 switches to the 116B position, it energizes terminal strip 125 which feeds current to limit switch 113 which is at that time in the 113B position due to the cable tension of the lift cable on the platform. Due to limit switch 113 being in the 113B position, current is fed to terminal strip 123 and from there to solenoid 152, which activates the solenoid thus energizing lift motor 150 across 150A and 150B. The lift motor 150 then feeds out cable, thus allowing the platform to rotate from the stored position to the intermediate position and to be lowered to the ground. When the platform contacts the ground, the springs switch limit switch 113 from 113B position to 113A position which results in cutting of the current to the motor 150 and thus stops the motor from paying out more cable. From the foregoing, it is seen that first mechanical and electrical means, carried by the vehicle, are provided which may be actuated to sequentially open a door at the vehicle doorway, rotate the platform from the stored position to the intermediate position, and lower the platform from the intermediate position to the ground position.

To close the platform or to raise the platform from the ground position into the stored position and close the doors can be done from outside the vehicle by the use of switch 101. In order to raise the platform, switch 101 is switched from 101B position to 101C position which energizes terminal strip 124. Current then passes through limit switch 112 which is in the 112A position. This energizes terminal strip 122 which feeds power to solenoid 151 which results in activating the lift motor 150 across terminals 150C and 150B. The lift motor 150 then retrieves cable until the platform is folded up in the vertical position. When the platform is in the vertical position, it contacts limit switch 112 on the standard and switches 112 from the 112A to the 112B position. This tops lift motor 150 and switches the current to 114 which is in the 114A position. Power is then directed to the relay 141 to connections 143 and 148. This results in energizing coil 141A which switches internal connections from 145 to 144 and from 146 and 147. This energizes the rear door closing motor 140 in reverse with the motor being energized across terminals 142 and 149 of relay 141. This starts closing the rear door. When the rear door is closed partway, the inner cam on motor 140 switches limit switch 117 from 117A position to 117B position which then directs current through limit switch 119 which is in the 119A position. Current is thus directed through limit switch 119 to the relay 131 across terminals 133 and 138 which results in energizing coil 131A in relay 131 which results in switching internally from 135 to 134 and from 136 to 137. This energizes the front motor 130 across relay terminals 132 and 139 and since the motor is now energized in reverse, it starts closing the front door. When the rear door is closed, the cam on motor 140 switches limit switch 114 to the 114B position to shut off power to motor 140. When the front door is closed, the cam on front motor 130 switches limit switch 119 to the 119B position to shut off power to the front motor 130. At this point, the platform is completely nested in the stored position, both doors are closed, and the circuitry is completely de-energized. It will be noted that second mechanical and electrical means, carried by the vehicle, are thus provided which may be actuated to sequentially lift the platform from the ground position to the intermediate position, rotate it from the intermediate position to the stored position and close the vehicle door.

Using the switch inside the vehicle, switch 102, the platform can be deployed from the stored position down to the horizontal intermediate position or it can be raised from either the intermediate position to the stored position or from the ground position to the stored position.

To deploy the platform from the stored or nested position with the doors closed down to the horizontal position ready for loading, switch 102 is switched by an occupant who is in the vehicle from the 102B position to the 102A position. This energizes terminal strip 126 which directs current through limit switch 118 which is in the 118A position at this time. This energizes relay 131 at contacts 135 and 136 to actuate the front drive motor 130 through relay contacts 132 and 139. As the front door opening motor 130 rotates and the front door opens, limit switch 115 which is normally in the 115A position is switched to the 115B position by a cam on the actuating arm of motor 130. When limit switch 115 is switched into the 115B position, current is directed through limit switch 116 which is in the 116A position. This energizes relay 141 at contact 145 and 146 which starts the rear motor 140 through relay contacts 142 and 149. When the rear door motor is started operating, it starts to open the rear door. At this point, both doors are opening with the front door being over half open while the rear door is just starting to open. When the front door is fully opened, the cam on motor 130 switches limit switch 118 to the 118B position thus shutting off power to the front motor 130 and holding the front door in the open position. When the rear door is fully opened, a cam on the rear door opening motor 140 switches limit switch 116 to the 116B position which shuts off power to the rear door motor 140 thus holding the rear door in the open position. When limit switch 116 is switched from 116A to 116B position, it directs current to terminal strip 125 which directs the current through limit switch 113 which is in the 113B position due to the fact that the lift cable is under tension at the time. The current is thus directed to terminal strip 123 which is energized and directs the current to solenoid 152 which activates solenoid 152 thus energizing the lift motor 150 across terminals 105A and 105B which result in the lift motor 150 paying out cable which allows the platform to lower under its own weight until limit switch 111 is switched by the hinge plate. When limit switch 111 is contacted by the hinge plate, it is switched from the 111A position to the 111B position at which point it cuts off current to solenoid 152 and thus de-energizes the lift motor 150. At this point the switch 102 circuit is not operable to lower the platform further. Thus it is seen that third mechanical and electrical means may be actuated to sequentially open the vehicle door and rotate the platform from the stored position to the intermediate position.

To raise the platform from the position substantially horizontal with the vehicle floor or from the ground position, switch 102 is switched from the 102B position to the 102C position. This energizes terminal strip 124 which directs current through limit switch 112 which is at that time in the 112A position. This energizes terminal strip 122 which feeds power to solenoid 151 activating solenoid 151 and consequently energizing lift motor 150 across terminals 150C and 150B. This rotates the motor 150 in such a direction to retrieve cable until the platform is folded up in the vertical position. When the platform is folded up in the vertical position, limit switch 122 is switched by the nesting action of the platform against the standard with limit switch 112 being switched from the 112A position to the 112B position. This stops the lift motor 150 from retrieving cable and the current is now directed through limit switch 114 which is in the 114A position. This energizes the coil 141A in relay 141 through terminals 143 and 148. Energizing of coil 141A results in switching internally from 145 to 144 and from connections 146 to 147. This results in energizing the rear door motor 140 across terminals 142 and 149 with the motor being energized in such a way that it operates in reverse and starts closing the rear door. When the rear door is closed partway, the cam on motor 140 switches limit switch 117 from the 117A position to the 117B position which then directs current through limit switch 119 which is in the 119A position to terminals 133 and 138 of relay 131. This energizes coil 131A of relay 131 which results in internal switching of contacts 135 to 134 and 136 to 137. This results in energizing the front motor 130 in reverse across terminals 132 and 139 of the relay and starts closing the front door. When the rear door is closed, a cam on motor 140 switches limit switch 114 to the 114B position to shut off power to the rear door motor 140 thus maintaining the door in a closed position. When the front door is closed, a cam on motor 130 switches limit switch 119 from the 119A position to the 119B position thus shutting off power to the front motor and effectively maintaining the front door in a closed position. At this point, the platform is completely nested in a vertical position, both doors are closed, and the circuitry is completely de-energized. Thus it will be noted that fourth mechanical and electrical means are provided which may be actuated to sequentially rotate the platform from the intermediate position to the stored position and close the vehicle door.

Switch 103, which is on a follower arm, is available and used by the operator as he is lowered on the platform from the vehicle floor intermediate level to the ground level or as he is raised from the ground level up to the intermediate position. This gives the operator control so he can move himself up and down between these two positions. When the platform is in the position substantially parallel to and level with the vehicle floor, the operator can wheel onto the platform and use switch 103 to lower himself to the ground. Switch 103 would be switched from the 103B position to the 103A position which feeds or directs current through limit switch 111, which at that time is in the 111B position due to the action of the hinge plate. This energizes terminal strip 126 which directs power through limit switch 115 which is in the 115B position and then through limit switch 116 which is in the 116B position. This results in energizing terminal strip 125 which feeds or directs current through limit switch 113 which is in the 113B position to energize terminal strip 123 and subsequently activate solenoid 152 which results in energizing the lift motor 150 across terminals 150A and 150B. This rotates the motor in such a direction as to pay out cable. When the platform contacts the ground, the lift motor 150 continues paying out cable until limit switch 113 is switched from the 113B position into the 113A position by slackening of the cable. When limit switch 113 is switched in the 113A position, it cuts off power to the lift motor 150 and de-energizes the control circuitry. At this point, the operator would wheel himself off the platform onto the ground. It is thus seen that fifth mechanical and electrical means are provided which may be actuated to lower the platform from the intermediate position to the ground position.

When the platform is on the ground, the operator can wheel himself onto the platform and use switch 103 to raise himself and the platform into the intermediate position substantially horizontal or level with the vehicle floor. He does this by switching switch 103 from the 103B position to the 103C position. This directs the current through the limit switch 110 which is in the 110B position and subsequently energizes terminal strip 124 which directs the current through limit switch 112, which is in the 112A position, to energize terminal strip 122. This results in activating solenoid 151 which then energizes lift motor 150 across terminals 150C and 150B. This rotates the motor in such a direction as to retrieve the cable. As the cable is retrieved, the springs on the platform are tightened, the cable is tensioned, and limit switch 113 is switched to the 113B position. The motor continues retrieving cable and lifting the platform until a substantially level position is reached. When the substantially level position is reached, limit switch 110 is switched from the 110B position to the 110A position by the action of the hinge plate lifting off the limit switch. When limit switch 110 is switched to the 110A position, power is shut off to the lift motor 150 and the platform is then maintained in substantially this level position while the operator wheels off the platform. Thus it is noted that sixth mechanical and electrical means are provided and may be activated to raise the platform from the ground position to the intermediate position.

It is apparent that a number of functions can be performed by different sequences of manipulating switches 101, 102, and 103. For instance, if a wheel chair operator is outside the vehicle and no operator inside the vehicle, he would use switch 101 to open the vehicle doors and to deploy the platform into the ground position. He would then wheel himself onto the platform and use switch 103 to lift the platform from the ground position to the position substantially level with the vehicle floor. He would then wheel himself into the vehicle and use switch 102 to lift the platform from the horizontal position into the nested position and to close the doors.

If, on the other hand, the operator is inside the vehicle with the platform in the nested position and the doors closed, he would use switch 102 to open the doors and to lower the platform into the horizontal or level position. He would then wheel himself onto the platform and use switch 103 to lower himself to the ground position. He would then wheel himself off the platform to the ground and use switch 101 to lift the platform from the ground position to the nested position and to close the doors.

Another potential variation would be if there are two wheel chair operators, one of which wants to leave the vehicle. In that case, the inside switch 102 would be used to open the doors and bring the platform down to the horizontal position. The one wheel chair patient may then wheel onto the platform and lower the platform to the ground and the wheel chair patient in the vehicle may then use the inside switch 102 to raise the platform back up from the ground position back up to the nested position.

It is apparent that there are probably other combinations of usage of these three particular switches which could be used under different circumstances.

What is claimed is:

1. A lift assembly, for use in association with a vehicle having a floor surface and a doorway at which the lift assembly is located, comprising:
   a platform, having an upper surface and outer and inner edges, rotatable between an upstanding stored position interior of the vehicle and an intermediate position outside the vehicle and substantially level with the immediately adjacent floor surface of the vehicle, and which can be raised or lowered disposed in a plane substantially parallel to the vehicle's floor surface between the intermediate position and a ground position, said platform inner edge being closer to the vehicle, when in the intermediate position, than the outer edge;
   a pair of parallelogrammatic linkages connecting the vehicle and the platform, each linkage comprising pivotally connected parallel links disposed in a common substantially vertical plane and extending along a respective side of said platform and inwardly beyond said inner edge, each of said linkages having an inner link pivotally connected at its upper end only to the vehicle adjacent said vehicle floor surface and an outer link rigidly connected to said platform at its upper surface and near said outer edge thereof;
   each inner link being adapted to rotate about its pivot connection with the vehicle when the lift assembly is moving between the stored and intermediate positions, but being adapted to abut the vehicle, when the lift assembly is moving between the intermediate and ground positions, to prevent further rotation of the platform;
   means for associating the platform and linkages together when rotating between the stored and intermediate positions so that they move in unison and form a compact assembly;
   a pair of upstanding spaced standards attached to the vehicle just inwardly of the doorway, one of said linkages being positioned adjacent the base of each standard;
   drum means rotatably carried by the vehicle;
   means carried by the vehicle for rotating the drum means in either direction when required; and
   a pair of cables, each having one end attached to the drym means for being wound and unwound thereon, the other ends of said cables running over a position upwardly on a respective one of said standards and downwardly to a respective side of said platform for connection therewith intermediate said inner and outer edges and nearer the inner edge thereof, said cables being operative to apply lifting forces to said platform only at said side connections to raise, lower and rotate the platform between positions.

2. The lift assembly as set forth in claim 1 wherein the inner link of each linkage is pivotally connected at its upper end only to the vehicle.

3. The lift assembly as set forth in claim 1 wherein:
   each of said standards carries a pulley adjacent its upper end and the respective cable extends over the pulley, and
   said standards are operative to limit the upward rotation of the platform and linkages to the stored position.

4. The lift assembly as set forth in claim 1 wherein said vehicle has one or more doors for closing said doorway and wherein said lift assembly also includes:
   mechanical means for opening the door or doors;
   means associated with the vehicle for sequentially actuating the means for opening the doors and the means for rotating the drums;
   means for automatically stopping the rotation of the drums when said platform has rotated from the stored position to the intermediate position; and
   means, accessible to a user on the platform, for actuating the means for rotating the drums for lowering the platform from the intermediate position to ground.

5. The lift assembly as set forth in claim 1 wherein said vehicle has one or more doors for closing said doorway and wherein said lift assembly also includes:
   first mechanical and electrical means, carried by the vehicle, which may be actuated to sequentially open a door at the vehicle doorway, and activate the drum rotating means to rotate the platform from the stored position to the intermediate position, and to lower the platform from the intermediate position to the ground position;
   second mechanical and electrical means, carried by the vehicle, which may be actuated to activate the drum rotating means to sequentially lift the platform from the ground position to the intermediate position, rotate it from the intermediate position to the stored position, and then to close the vehicle door;
   third mechanical and electrical means, carried by the vehicle, which may be actuated to sequentially open the vehicle door and to activate the drum rotating means to rotate the platform from the stored position to the intermediate position;
   fourth mechanical and electrical means, carried by the vehicle, which may be actuated to activate the drum rotating means to sequentially rotate the platform from the intermediate position to the stored position and then to close the vehicle door;
   fifth mechanical and electrical means, carried by the vehicle, which may be actuated to activate the drum rotating means to lower the platform from the intermediate position to the ground position; and
   sixth mechanical and electrical means, carried by the vehicle, which may be actuated to activate the drum rotating means to raise the platform from the ground position to the intermediate position.

6. The lift assembly as set forth in claim 5 wherein:

said first and second means each includes control switch means which may be actuated from outside the vehicle;

said third and fourth means each includes control switch means which may be actuated from inside the vehicle; and said fifth and sixth means each includes control switch means which may be actuated from the platform.

* * * * *